S. W. HERSEY.
UNDERGROUND CONDUIT FOR STEAM PIPES.
APPLICATION FILED FEB. 15, 1909.
921,399.
Patented May 11, 1909.
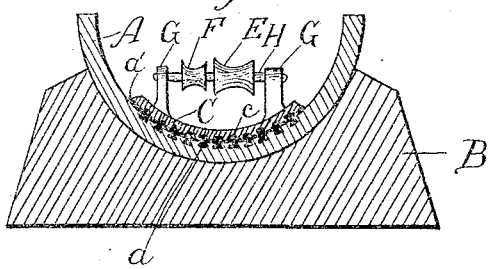
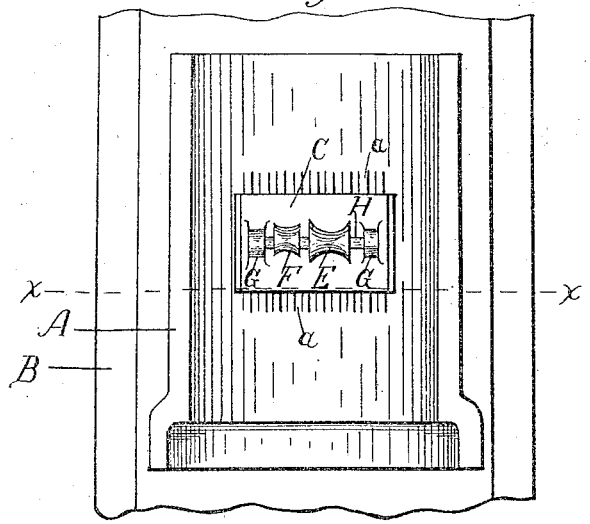
Witnesses:
E. W. Hinckley
E. W. Dennis
Inventor.
Seth W. Hersey
by S. W. Bates
Atty.

UNITED STATES PATENT OFFICE.

SETH W. HERSEY, OF PORTLAND, MAINE.

UNDERGROUND CONDUIT FOR STEAM-PIPES.

No. 921,299.  Specification of Letters Patent.  Patented May 11, 1909.

Application filed February 15, 1909. Serial No. 477,938.

*To all whom it may concern:*

Be it known that I, SETH W. HERSEY, of Portland, in the county of Cumberland, State of Maine, have invented certain new and useful Improvements in Underground Conduits for Steam-Pipes, of which the following is a specification.

My invention relates to underground conduits for carrying steam pipes and the general object of the invention is to provide a suitable roller support for the pipes within the conduit which may be cheaply made and installed and which will have sufficient strength to carry steam pipes of ordinary weight.

According to common practice at the present time steam pipes are carried underground in conduits made up of split sections of vitrified earthenware pipe, the lower half being first laid, the steam pipes supported therein by means of roller bearings placed at suitable intervals. The top sections are then put on, their edges being cemented to the edges of the lower sections to form water tight joints and finally the whole is stuffed with asbestos waste or other non-conducting material.

The roller bearings for supporting the steam pipes have sometimes been composed of wide supporting plates of cast iron conforming as nearly as possible to inner surface of the pipe section but owing to the fact that neither the casting of the plate or the surface of the pipe were truly cylindrical the plate was liable to bear at but two or three points and with this unequal bearing the weight of the steam pipes was liable to break the conduit pipe. Again, with the constant expansion and contraction of the steam pipes there was a tendency to move the roller supports particularly in a direction lengthwise of the conduit.

It is the particular object of my present invention to provide a roller bearing which shall be supported directly on the inside of the conduit pipe, which shall have a uniform bearing thereby enabling the conduit pipe to stand the necessary strain and which shall be firmly fixed in place without the use of bolts or any similar fastening devices.

With these objects in view I form the conduit as hereinafter described and claimed.

I illustrate my invention by means of the accompanying drawing in which is shown the lower half of a section of the conduit with the roller support in place.

In the drawing Figure 1 is a cross section taken on x x of Fig. 2, and Fig. 2 is a plan view of a single section with the roller support in position.

The split pipe section A is supported on the usual concrete foundation B which is laid in the bottom of the ditch. When the pipe section is in the process of manufacture and before it is burned, parallel dovetailed grooves are formed covering a sufficiently large area at the bottom of the pipe to provide a bearing for the plate C which carries the rollers. The plate C is preferably formed of a casting having parallel grooves c which may correspond generally with the grooves a in the conduit pipe. The plate C conforms generally to the inner surface of the conduit pipe and is secured firmly to it by a body of Portland cement or other suitable cementitious material as a' interposed between the plate C and the pipe. The rollers E, F as here shown are loosely mounted on a shaft H which is carried by the uprights G, the latter being formed integral with the plate C. The roller support, being thus secured to the conduit pipe, has a perfectly even bearing so that the pipe will bear the weight of the steam pipe in all ordinary cases without breaking. The bond formed by the opposing grooves and the cement also holds the roller support firmly in place and prevents its moving under the influence of the expansion and contraction of the steam pipe. The plate C is made of sufficient area so as to avoid all danger of breakage to the conduit pipe.

The scoring of the conduit pipe may be in straight parallel lines as shown or the pipe may be otherwise scored and the under side of the casting may be roughened otherwise than by forming it with parallel grooves. In many cases the ordinary roughness of the casting will be sufficient to cause it to adhere to the body of cement when the latter is firmly held by the grooves of the conduit pipe.

The construction herein shown and described may be modified in its details without departing from the spirit of my invention.

I claim:—

1. The herein described underground conduit for steam pipes comprising a split pipe section of earthenware having grooves scored in the inner surface thereof, a base plate resting on the scored portion of the pipe, rollers carried by said plate and a body of cementitious material interposed between the base plate and the pipe section.

2. The herein described underground conduit for steam pipes comprising a split pipe section of earthenware having dovetailed grooves scored in the inner surface thereof, a base plate resting on the scored portion of the pipe, rollers carried by said plate and a body of cementitious material interposed between the base plate and the pipe section.

3. The herein described underground conduit for steam pipes comprising a split pipe section of earthenware having grooves scored in the inner surface thereof, a base plate resting on the scored portion of the pipe, said base plate having grooves formed on its under side, rollers carried by said plate and a body of cementitious material interposed between the base plate and the pipe section.

In witness whereof I have hereunto set my hand this 12th day of Feby., 1909.

SETH W. HERSEY

Witnesses:
S. W. BATES,
E. W. DENNIS.